US012163596B1

(12) United States Patent
Brice

(10) Patent No.: US 12,163,596 B1
(45) Date of Patent: Dec. 10, 2024

(54) LIQUID RESERVOIR EVACUATION APPARATUS AND METHOD

(71) Applicant: John L. Brice, Potaluma, CA (US)

(72) Inventor: John L. Brice, Potaluma, CA (US)

( * ) Notice: Subject to any disclaimer, the term of this patent is extended or adjusted under 35 U.S.C. 154(b) by 0 days.

(21) Appl. No.: 18/667,021

(22) Filed: May 17, 2024

Related U.S. Application Data

(63) Continuation-in-part of application No. 18/475,487, filed on Sep. 27, 2023, now abandoned.

(51) Int. Cl.
*F16K 24/04* (2006.01)
*E03C 1/04* (2006.01)
*E03C 1/046* (2006.01)

(52) U.S. Cl.
CPC ............ *F16K 24/04* (2013.01); *E03C 1/0408* (2013.01); *E03C 1/046* (2013.01)

(58) Field of Classification Search
CPC .......... B01F 25/31251; B01F 25/31243; B01F 25/312; B01F 25/313
USPC .......................................................... 137/888
See application file for complete search history.

(56) References Cited

U.S. PATENT DOCUMENTS 2,058,901 A * 10/1936 McPherson ........... B01F 25/316 137/893
2,588,255 A * 3/1952 Larsh ...................... E03C 1/046 239/398
2,592,896 A * 4/1952 Hayes ................... B01F 25/316 239/523
3,122,325 A * 2/1964 Mahrt ..................... B05B 1/267 239/340
3,686,946 A * 8/1972 Halmi ....................... G01F 1/44 73/861.64
4,123,800 A * 10/1978 Mazzei ............... B01F 25/4336 366/181.5
4,358,056 A * 11/1982 Greenhut ................ E03C 1/046 222/162
6,926,212 B1 * 8/2005 Glass ...................... E03C 1/046 239/320
7,201,331 B2 * 4/2007 Bertrand ................. E03C 1/046 239/304
8,702,018 B1 * 4/2014 Rivera .................... E03C 1/046 239/311
8,991,419 B2 * 3/2015 Brice ...................... E03C 1/084 137/513.3
2006/0048820 A1 * 3/2006 Horner .................... B08B 3/026 137/382
2006/0109736 A1 * 5/2006 Neto ..................... B01F 25/312 366/69

(Continued)

*Primary Examiner* — Umashankar Venkatesan
(74) *Attorney, Agent, or Firm* — J. Nevin Shaffer, Jr.

(57) ABSTRACT

An improved liquid reservoir evacuation apparatus and method including a fixture with a venturi valve. A first liquid reservoir where the first liquid reservoir has an outlet. A first on/off valve connected with the first liquid reservoir outlet. An air intake with a first section and a second section where the first section of the air intake allows air outside of the fixture into the fixture and the second section connects the first on/off valve with the venturi valve, intersecting the venturi valve and exiting the fixture at an exit. A second liquid reservoir with an outlet connected with the fixture exit. A second on/off valve connected with the second liquid reservoir outlet and a third on-off valve connected with the fixture such that liquid flow from the second end is allowed or prevented.

5 Claims, 3 Drawing Sheets

12 31 11 20 18 28 27 40 38 29 42 44 26 48 22 23 46 10 24 50

(56) References Cited

U.S. PATENT DOCUMENTS

2006/0234616 A1* 10/2006 Holzwarth ............ B01F 25/312
452/1
2015/0157992 A1* 6/2015 Boticki ................ B01F 23/451
137/888
2021/0105934 A1* 4/2021 Inman .................. A01C 23/007

* cited by examiner

LIQUID RESERVOIR EVACUATION APPARATUS AND METHOD

CROSS REFERENCE TO RELATED APPLICATIONS

This application claims the benefit of previously filed U.S. provisional patent application No. 63/410,677 filed Sep. 28, 2022 for a "Liquid Reservoir Evacuation Apparatus and Method". The Applicant hereby claims the benefit of this provisional application under 35 U.S.C. § 119. The entire content of this provisional application is incorporated herein by this reference. Further, this application is a Continuation in Part of pending U.S. patent application Ser. No. 18/475,487 filed Sep. 27, 2023 entitled "Liquid Reservoir Evacuation Apparatus and Method" The Applicant hereby claims the benefit of the non-provisional application under 35 U.S.C. § 120. The entire content of the non-provisional application is incorporated herein by this reference.

FIELD OF THE DISCLOSURE

The present invention pertains to an improved liquid reservoir evacuation apparatus and method including a fixture with a first end and a second end and a venturi valve with an inlet with a diameter and an outlet with a diameter where the inlet has a smaller diameter than the diameter of the outlet. A first liquid reservoir configured to contain a liquid where the first liquid reservoir has an outlet. A first on/off valve connected with the first liquid reservoir outlet, where the first on/off valve is configured to open and shut the connection with the first liquid reservoir outlet. An air intake with a first section and a second section where the first section of the air intake allows air outside of the first on/off valve into the first on/off valve and where the second section connects the first on/off valve with the venturi valve transverse to the inlet and outlet, intersecting the venturi valve at the smaller diameter inlet and exiting the fixture at an exit. A second liquid reservoir connected with the fixture exit, configured to contain a liquid where the second liquid reservoir has an outlet. A second on/off valve connected with the second liquid reservoir outlet, where the second on/off valve is configured to open and shut the connection with the second liquid reservoir outlet and a third on-off valve connected with the fixture such that liquid flow from the second end is allowed or prevented.

BACKGROUND OF THE INVENTION

There is a need in the shower head industry, for example only and not by limitation, for a reliable and powerful apparatus and method for evacuating to dryness a liquid reservoir container and its contents transferred during a showering process. Further, there is a need to conserve water. Both at home and elsewhere and in hospital settings, for example only, the need exists for the application of multiple different types of emollients, skin conditioners and medical applications, citric acid baths and the like to the entire body surface. Currently, hand held application, as with a soap bar or liquid for example, is all that is typically available and even that does not ensure complete use of the soap bar or even a liquid in a container.

The present art does not provide for the separate application of multiple types of liquids nor does it enable the conservation of water at the same time.

Thus, there is a need in the art for a process that addresses the aforementioned problems in a manner that is robust and flexible so as to accommodate a full spectrum of liquid container dispensing requirements including but not limited to use in shower enclosures as well as the conservation of water at the same time.

It therefore is an object of this invention to provide an improved liquid reservoir evacuation apparatus and method for insuring the evacuation of the container to dryness and for the conservation and reuse of water, for use in a showering process, for example only and not by limitation.

SUMMARY

Accordingly, an improved liquid reservoir evacuation apparatus and method, according to one embodiment, includes a fixture with a first end and a second end and a venturi valve with an inlet with a diameter and an outlet with a diameter where the inlet has a smaller diameter than the diameter of the outlet. A first liquid reservoir configured to contain a liquid where the first liquid reservoir has an outlet. A first on/off valve connected with the first liquid reservoir outlet, where the first on/off valve is configured to open and shut the connection with the first liquid reservoir outlet. An air intake with a first section and a second section where the first section of the air intake allows air outside of the first on/off valve into the fixture and where the second section connects the first on/off valve with the venturi valve transverse to the inlet and outlet, intersecting the venturi valve at the smaller diameter inlet and exiting the fixture at an exit. A second liquid reservoir connected with the fixture exit, configured to contain a liquid where the second liquid reservoir has an outlet. A second on/off valve connected with the second liquid reservoir outlet, where the second on/off valve is configured to open and shut the connection with the second liquid reservoir outlet and a third on-off valve connected with the fixture such that liquid flow from the second end is allowed or prevented.

In one aspect, the apparatus further includes a transfer device with a first end connected with the first on/off valve and a second end connected with the first liquid reservoir outlet where the transfer device is configured to transfer liquid from the first liquid reservoir to the first on/off valve when the first on/off valve is open.

In one aspect, the second section of the air intake has a first diameter, the venturi valve inlet has a second diameter and the venturi valve outlet has a third diameter where the first diameter is smaller than the second diameter and the second diameter is smaller than the third diameter.

In one aspect, the second end of the transfer device includes a cap configured to removably connect with the first liquid reservoir outlet.

In another aspect, the second end of the transfer device includes a reservoir extension where the reservoir extension is configured to extend into the first liquid reservoir.

In one aspect, the first liquid reservoir has a top with the outlet and a bottom and the reservoir extension extends into the liquid reservoir to the bottom of the first liquid reservoir.

In one aspect, the reservoir extension is a flexible tube.

In one aspect, the liquid in first liquid reservoir is selected from a group consisting of: emollients, skin conditioners, liquid soap and medicinal applications.

In another aspect, the liquid in second liquid reservoir is selected from a group consisting of: emollients, skin conditioners, liquid soap and medicinal applications.

In one aspect, the fixture is configured as a shower head for use in a shower.

In another embodiment, an improved liquid reservoir evacuation apparatus consists of a fixture with a first end and a second end and venturi valve with an inlet with a diameter and an outlet with a diameter where the inlet has a smaller diameter than the diameter of the outlet. A first liquid reservoir configured to contain a liquid where the first liquid reservoir has an outlet. A first on/off valve connected with the first liquid reservoir outlet, where the first on/off valve is configured to open and shut the connection with the first liquid reservoir outlet. An air intake with a first section and a second section where the first section of the air intake allows air outside of the fixture into the first on/off valve and where the second section connects the first on/off valve with the venturi valve transverse to the inlet and outlet, intersecting the venturi valve at the smaller diameter inlet and exiting the fixture at an exit. A transfer device with a first end connected with the first on/off valve and a second end connected with the first liquid reservoir outlet where the transfer device is configured to transfer liquid from the first liquid reservoir to the first on/off valve when the first on/off valve is open and where the second end of the transfer device includes a reservoir extension where the reservoir extension is configured to extend into the first liquid reservoir. A second liquid reservoir connected with the fixture exit, configured to contain a liquid where the second liquid reservoir has an outlet. A second on/off valve connected with the second liquid reservoir outlet, where the second on/off valve is configured to open and shut the connection with the second liquid reservoir outlet and a third on-off valve connected with the fixture such that liquid flow from the second end is allowed or prevented.

In one aspect, the second section of the air intake has a first diameter, the venturi valve inlet has a second diameter and the venturi valve outlet has a third diameter and where the first diameter is smaller than the second diameter and the second diameter is smaller than the third diameter.

In one aspect, the second end of the transfer device includes a cap configured to removably connect with the first liquid reservoir outlet.

In one aspect, the first liquid reservoir has a top with the outlet and a bottom and the reservoir extension extends into the first liquid reservoir to the bottom of the first liquid reservoir.

In another aspect, the fixture is configured as a shower head for use in a shower.

In one aspect, the liquid in the first liquid reservoir is selected from a group consisting of: emollients, skin conditioners, liquid soap and medicinal applications.

In another aspect, the liquid in second liquid reservoir is selected from a group consisting of: emollients, skin conditioners, liquid soap and medicinal applications.

According to another embodiment, an improved liquid reservoir evacuation method consists of:

a. providing a fixture with a first end and a second end and a venturi valve with an inlet with a diameter and an outlet with a diameter where the inlet has a smaller diameter than the diameter of the outlet; a first liquid reservoir configured to contain a liquid where the first liquid reservoir has an outlet; a first on/off valve connected with the first liquid reservoir outlet, where the first on/off valve is configured to open and shut the connection with the first liquid reservoir outlet and an air intake with a first section and a second section where the first section of the air intake allows air outside of the first on/off valve into the fixture and where the second section connects the first on/off valve with the venturi valve transverse to the inlet and outlet, intersecting the venturi valve at the smaller diameter inlet and exiting the fixture at an exit; a second liquid reservoir connected with the fixture exit, configured to contain a liquid where the second liquid reservoir has an outlet; a second on/off valve connected with the second liquid reservoir outlet, where the second on/off valve is configured to open and shut the connection with the second liquid reservoir outlet and a third on-off valve connected with the fixture such that liquid flow from the second end is allowed or prevented; and
b. connecting the first end of the fixture to a fluid source.

In one aspect, the method further includes:

a. adding liquid to the first liquid reservoir; and
b. adjusting the first on/off valve to open the connection with the liquid reservoir outlet.

In another aspect, the method further includes:

a. closing the first on-off valve and third on-off valve; and
b. opening the second on-off valve so as to add fluid from the fluid source to the second liquid reservoir.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF EMBODIMENTS

Figure 1:
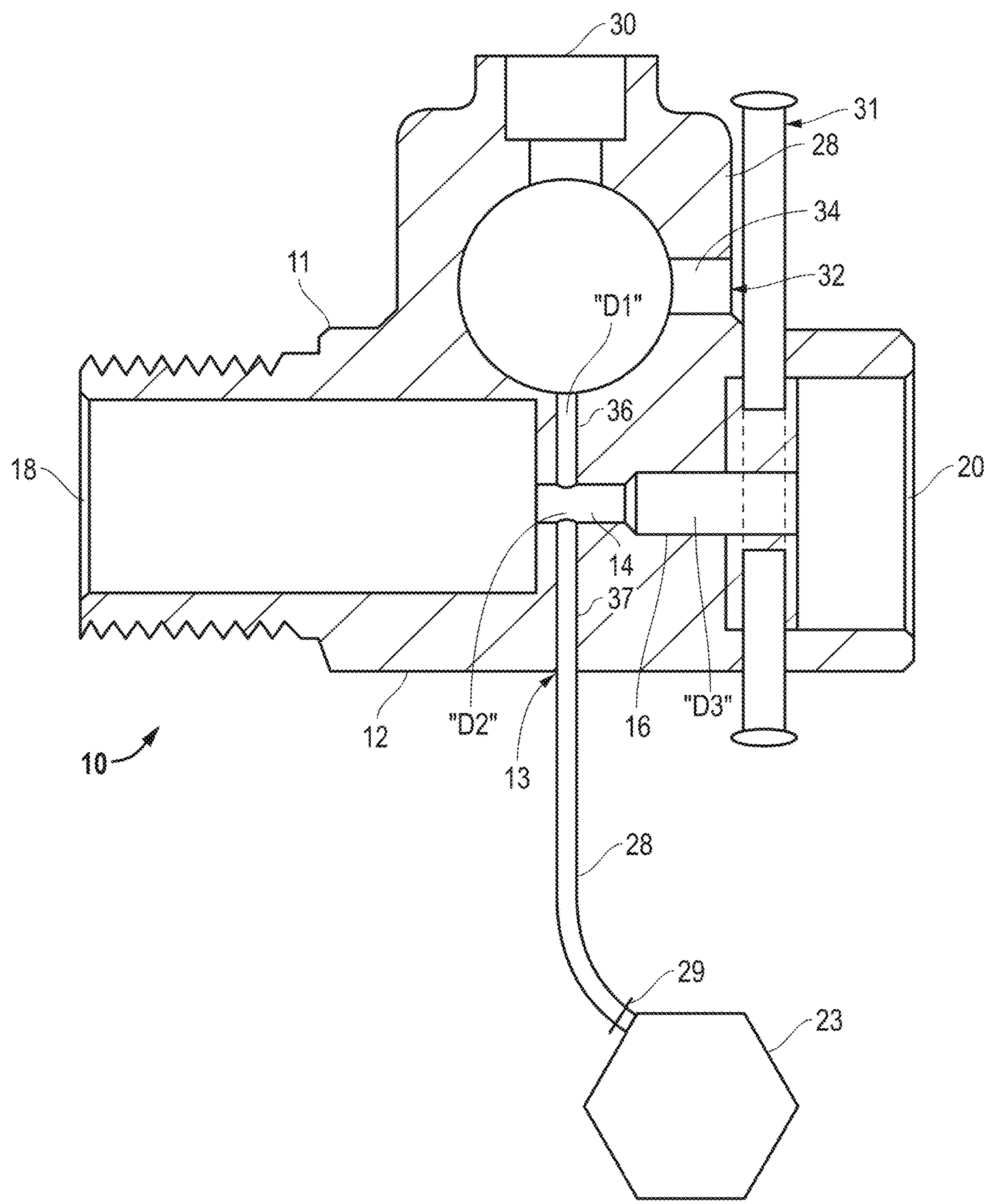
FIG. 1 is a top cross section view of the improved liquid reservoir evacuation apparatus according to a preferred embodiment in the "on" position.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

Figure 2:
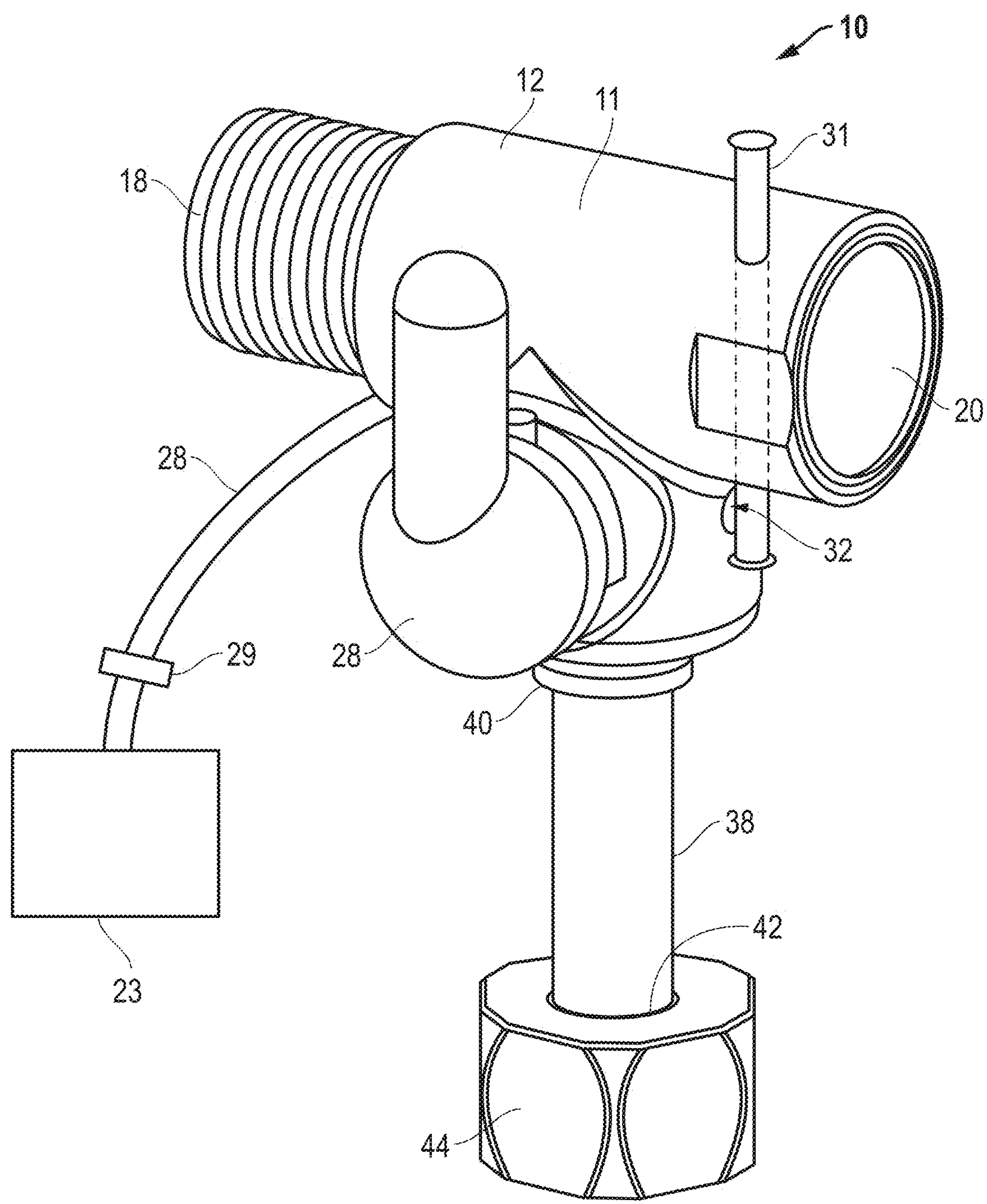
FIG. 2 is a perspective view of the invention of FIG. 1 including a transfer device and cap.
Figure 3:
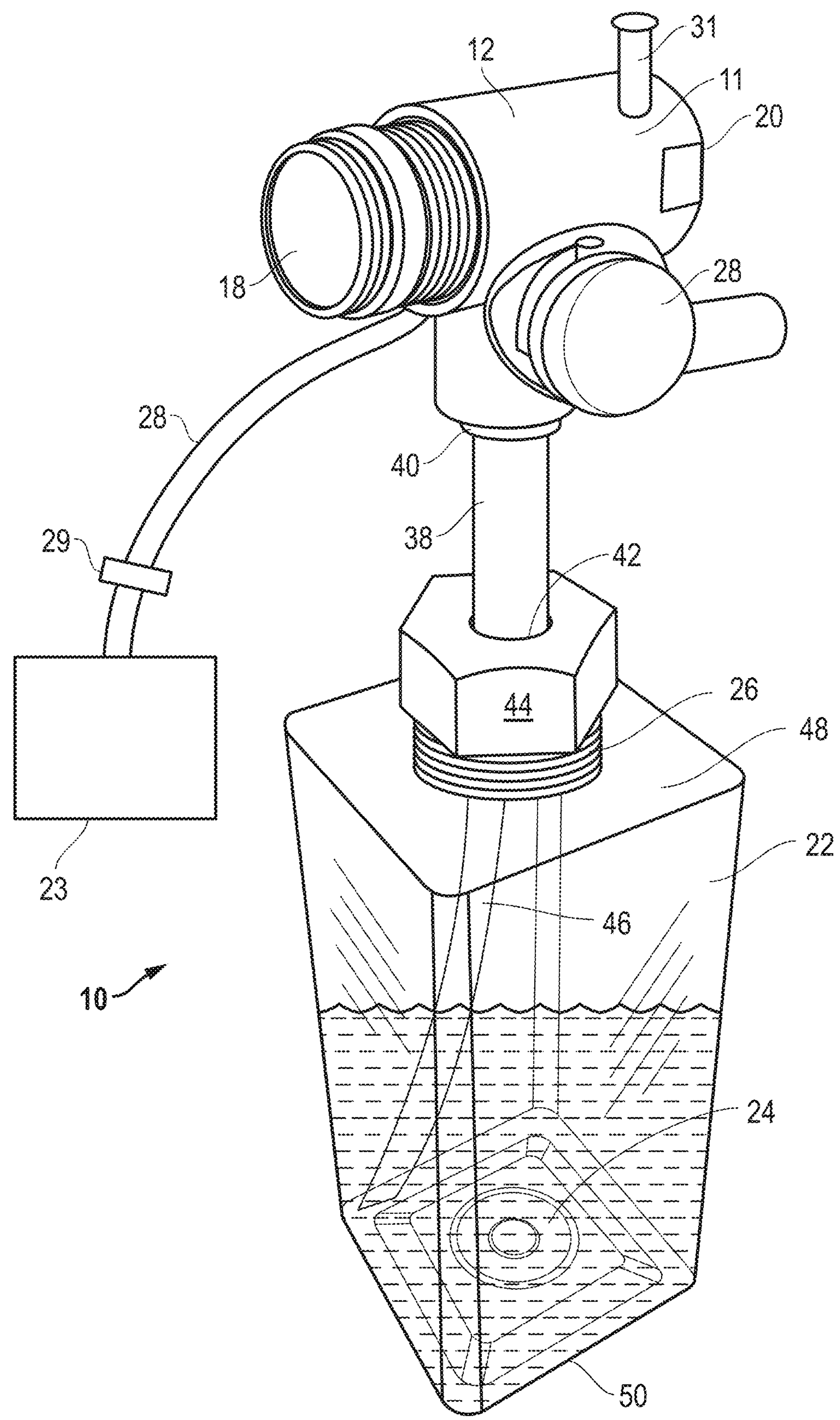
FIG. 3 is a perspective view of the invention of FIG. 1 in the "off" position, connected with fluid reservoirs with a fluid transfer device and reservoir extension.

One embodiment of the present invention is illustrated by way of example in FIGS. 1-3. Referring to FIG. 1, according to one embodiment, improved liquid reservoir evacuation apparatus 10 preferably consists of a fixture 11 with a first end 18 and a second end 20 with a venturi valve 12 with an inlet 14 with a diameter and an outlet 16 with a diameter. As shown, the inlet 14 has a smaller diameter, "D2", than the diameter, "D3" of the outlet 16, as will be described more fully hereafter. In operation, fluid, such as water for example only, enters the first end 18 of the fixture 11 then flows on to venturi valve 12, passes through smaller diameter D2 inlet 14 to larger diameter D3 outlet 16, and out of second end 20 of fixture 11. As can be understood, second end 20 may be configured for use as a shower head or the like, not shown for clarity.

As shown in FIG. 3, first liquid reservoir 22 is configured to contain a liquid 24 where the first liquid reservoir 22 has an outlet 26. Referring again to FIG. 1, a first on/off valve 28 is configured to connect with the liquid reservoir outlet 26 at connection 30. The first on/off valve 28 is configured to open and shut the connection with the liquid reservoir outlet 26. FIGS. 1 and 2 show the on/off valve 28 in the open or "on" position. FIG. 3 shows the on/off valve 28 in the shut or "off" position.

Still referring to FIG. 1, air intake 32 is provided, preferably, in first on/off valve 28 with a first section 34 and a second section 36, where the first section 34 of the air intake 32 allows air outside of the fixture 11, first on/off valve 28, into the fixture 11 as at first on/off valve 28, for example. The second section 36 connects the first on/off valve 28 with the venturi valve 12 transverse to the inlet 14 and outlet 16, intersecting the venturi valve 12 at the smaller diameter D2 inlet 14 as shown and exiting fixture 11 at exit 13. Applicant has found that this intersection point functions best in testing.

Again, importantly, improved liquid reservoir evacuation apparatus 10 includes a third section 37 continuing from second section 36 and exiting the fixture 11 on the opposite side as shown at exit 13. Third section 37 is connected by means of another transfer device 38 with a second liquid reservoir 23. A second on-off valve 29 controls the addition and extraction of liquid 24 into and out of second liquid reservoir 23, as described more fully hereafter. Certainly, additional liquid reservoirs are included within the scope of the invention.

Still referring to FIG. 1, a third on-off valve 31, as shown at the second end 20 of the fixture 11, is provided where the third on-off valve 31 operates to allow or prevent any liquid 24, water or the like, from exiting the fixture 11 at second end 20.

In another aspect, the second section 36 and third section 37 of the air intake 32 has a first diameter "D1", the venturi valve inlet 14 has a second diameter "D2" and the venturi valve outlet 16 has a third diameter "D3" and where the first diameter "D1" is smaller than the second diameter "D2" and the second diameter "D2" is smaller than the third diameter "D3" as illustrated. Applicant has found by testing that this configuration and structure unexpectedly provides the most efficient evacuation effect.

In operation, when fluid, water for example only, is passing from first end 18 through fixture 11 to venturi valve 12, air is drawn into the fixture 11, as at first on/off valve 28, through air intake 32 which creates a suction at connection 30 of first on/off valve 28, which, when in the "on" or open position as shown in FIGS. 1 and 2, creates a suction on first liquid reservoir 22. Liquid 24 is drawn into first on/off valve 28 and passes through second section 36 of air intake 32, into inlet 14 and out of second end 20 of outlet 16 of venturi valve 12 and fixture 11.

On the other hand, when first on/off valve 28 is in the "off" or shut position, as shown in FIG. 3, the connection 30 with outlet 26 of first liquid reservoir 22 is closed. Air intake 32, however, remains open and functional in the "off" or shut position. This structure enables fluid passing through fixture 11, venturi valve 12, to be aerated even though it is without liquid 24 from first liquid reservoir 22.

Further, individuals taking a shower, for example only, usually allow the water to run until warm water flows. Improved liquid reservoir evacuation apparatus 10 saves the previously wasted water. To do so, first on-off valve 28 is closed as well as third on-off valve 31 while second on-off valve 29 is opened. As shown in FIG. 1, water then flows into second liquid reservoir 23. When ready to shower, a user opens third on-off valve 31 and warm water flows out of the fixture 11 second end 20. At that point a user can add liquid 24 from first liquid reservoir 22 by opening first on-off valve 28. Additionally, by keeping second on-off valve 29 open, previously collected cold water, for example, in second liquid reservoir 23 can be reintroduced into the water flow and not wasted. Certainly, liquid may be retained for later use simply by closing second on-off valve 29 during operation. Additionally, any liquid may be retained in second liquid reservoir 23 such that it may contain a different liquid 24, cream or treatment of some sort, than that in first liquid reservoir 22, for example. Shampoo in first liquid reservoir 22 and conditioner in second liquid reservoir 23, for example only and not by limitation.

First on-off valve 28, second on-off valve 29 and third on-off valve 31 may be a sliding pin type valve as are known or any type now known or hereafter developed. They may be adjustable as well, such that the on-off valve may only partially close or open the apparatus. For example, by keeping second on-off valve 29 partially open, the amount of previously collected cold water in second liquid reservoir 23 reintroduced into the water flow can be adjusted to make the flow cooler or warmer as the user desires.

Referring now to FIGS. 2 and 3, in one embodiment, improved liquid reservoir evacuation apparatus 10 includes a transfer device 38 with a first end 40 connected with the first on/off valve 28 and a second end 42 connected with the liquid reservoir outlet 26. The transfer device 38 is configured to transfer liquid 24 from the first liquid reservoir 22 to the first on/off valve 28 when the first on/off valve 28 is "on" or open. In one aspect, the second end 42 of the transfer device 38 includes a cap 44 configured to removably connect with the liquid reservoir outlet 26.

As shown in FIG. 3, in one aspect, the second end 42 of the transfer device 38 includes a reservoir extension 46 and the reservoir extension 46 is configured to extend into the first liquid reservoir 22. In a further aspect, the liquid reservoir has a top 48 with the outlet 26 and a bottom 50 and the reservoir extension 46 extends into the first liquid reservoir 22 to the bottom 50 of the liquid reservoir 22.

Preferably, the reservoir extension 46 is a flexible tube and in another aspect, the flexible tube is plastic. This same structure may be employed with second liquid reservoir 23 and second on-off valve 29 as desired.

In operation, when liquid 24 is no longer wanted to be dispersed from first liquid reservoir 22, the user simply closes the first on/off valve 28 to the "off" or shut position. Importantly, if it is desired to empty first liquid reservoir 22 completely or if the on/off valve 28 is left "on" or open long enough, the entire contents of first liquid reservoir 22 will be emptied to dryness. Again, operation of the second on-off valve 29 in the same manner, i.e. closing it, prevents removal or introduction of liquid into second liquid reservoir 23.

By way of further description, improved liquid evacuation apparatus and method 10 is a multi-function valve that includes multiple adjustments for the application of liquids in amounts and at temperatures suitable to a user's needs without wasting water. At the start of a shower, for example only and not by limitation, third on-off valve 31 and first on-off valve 28 are placed in the closed or "off" position and second on-off valve 29 is opened. When the shower is turned on and water flows into first end 18 of fixture 11 it is directed to second liquid reservoir 23 where it is collected for later use. Once the user decides the water is warm enough, either by opening third on-off valve 31 or accessing the fluid in second liquid reservoir 23, opening third on-off valve 31 allows water to flow out of second end 20 of fixture 11. At this time, a user may introduce liquid 24 from first liquid reservoir 22 by opening first on-off valve 28 as described above. Also, second on-off valve 29 may be closed or left open to allow reintroduction of collected water, or an additional type of liquid 24 as described above, to the now warm water flow.

Applicant has determined by testing that the addition of third section 37 to provide for the collection and reuse of previously wasted water and/or the introduction of another liquid 24 does not diminish the capability of the apparatus to pull vacuum strong enough to lift a column of water/liquid 24 from the liquid reservoirs 22 and 23 or more.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. An improved liquid reservoir evacuation method consisting of:

a. providing a fixture with a first end and a second end and a venturi valve with an inlet with a diameter and an outlet with a diameter wherein said inlet has a smaller diameter than the diameter of said outlet; a first liquid reservoir configured to contain a liquid wherein said first liquid reservoir has an outlet; a first on/off valve connected with said first liquid reservoir outlet, wherein said first on/off valve is configured to open and shut the connection with said first liquid reservoir outlet and an air intake with a first section a second section wherein the first section of said air intake allows air outside of said first on/off valve into said fixture and wherein said second section connects said first on/off valve with said venturi valve transverse to said inlet and outlet, intersecting said venturi valve at said smaller diameter inlet and exiting the fixture at an exit; a second liquid reservoir connected with the fixture exit, configured to contain a liquid wherein said second liquid reservoir has an outlet; a second on/off valve connected with said second liquid reservoir outlet, wherein said second on/off valve is configured to open and shut the connection with said second liquid reservoir outlet and a third on-off valve connected with the fixture such that liquid low from the second end is allowed or prevented:

b. connecting said first end of said fixture to a fluid source:

c. closing the first on-off valve and third on-off valve; and d. opening the second on-off valve so as to add fluid from said fluid source to said second liquid reservoir.

2. The method of claim 1 further including:

a. adding liquid to said first liquid reservoir; and b. adjusting said first on/off valve to open the connection with the liquid reservoir outlet.

3. The method of claim 1 wherein the liquid in the first liquid reservoir is selected from a group consisting of: emollients, skin conditioners, liquid soup and medicinal applications.

4. The method of claim 1 wherein the liquid in the second liquid reservoir is selected from a group consisting of: emollients, skin conditioner, liquid soap and medicinal applications.

5. The method of claim 1 wherein the fixture is configured as a shower head for use in a shower.

* * * * *

UNITED STATES PATENT AND TRADEMARK OFFICE

CERTIFICATE OF CORRECTION

PATENT NO. : 12,163,596 B1
APPLICATION NO. : 18/667021
DATED : December 10, 2024
INVENTOR(S) : John L. Brice It is certified that error appears in the above-identified patent and that said Letters Patent is hereby corrected as shown below:

In the Claims

In Claim 1a, Column 8, Line 13: "an air intake with a first section a second section" should read --an air intake with a first section and a second section--.

In Claim 1a, Column 8, Line 27: "such that liquid low from the second end is allowed" should read --such that liquid flow from the second end is allowed--.

Signed and Sealed this
Fifteenth Day of April, 2025

Coke Morgan Stewart
*Acting Director of the United States Patent and Trademark Office*